(12) United States Patent
Juutinen et al.

(10) Patent No.: US 6,551,458 B2
(45) Date of Patent: Apr. 22, 2003

(54) METHOD AND APPARATUS FOR RECOVERING FIBERS FROM WHITE WATER OF PAPER MILL

(75) Inventors: Vesa Juutinen, Tampere (FI); Timo Pekkarinen, Tampere (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/021,178

(22) Filed: Oct. 30, 2001

(65) Prior Publication Data

US 2002/0074099 A1 Jun. 20, 2002

Related U.S. Application Data

(63) Continuation of application No. PCT/FI00/00386, filed on May 2, 2000.

(30) Foreign Application Priority Data

May 3, 1999 (FI) .................................................. 991003

(51) Int. Cl.[7] .............................. D21F 1/66; B01D 36/02
(52) U.S. Cl. ....................... 162/190; 162/189; 162/264; 210/331; 210/486; 210/928
(58) Field of Search .......................... 162/29, 55, 190, 162/189, 264; 210/193, 928, 331, 486

(56) References Cited

U.S. PATENT DOCUMENTS 5,073,264 A * 12/1991 Immonen et al. ............ 210/404
5,192,454 A * 3/1993 Immonen et al. ............ 210/780
5,196,090 A 3/1993 Corbellini et al.
5,368,693 A 11/1994 Vikio
5,593,542 A 1/1997 Wolfer et al.
5,753,080 A * 5/1998 Karvonen .................... 162/190

FOREIGN PATENT DOCUMENTS

| FI | 88732 | 12/1991 |
|---|---|---|
| JP | 04 272292 | 9/1992 |
| WO | WO 95/09268 | 4/1995 |
| WO | WO 97/32079 | 9/1997 |

* cited by examiner

Primary Examiner—Dean T. Nguyen
(74) Attorney, Agent, or Firm—Alston & Bird LLP

(57) ABSTRACT

In a papermaking process, filtering of white water containing fiber material is performed by feeding the white water to a filter on a surface of which a layer of auxiliary pulp has been formed, such that the white water is filtered through the layer of auxiliary pulp and fiber material in the white water remains in the layer of auxiliary pulp. The mixture of auxiliary pulp and fiber material is removed from the filter and is fed to a fractionating screen. The screen separates the mixture into a short-fibered pulp fraction that can be returned to the papermaking process, and a long-fibered pulp fraction that is returned to the filter where it is used as auxiliary pulp to form a layer on the filter surface.

16 Claims, 3 Drawing Sheets

METHOD AND APPARATUS FOR RECOVERING FIBERS FROM WHITE WATER OF PAPER MILL

CROSS-REFERENCE TO RELATED APPLICATION

This application is a continuation of International Application PCT/FI00/00386 filed May 2, 2000, which was published in the English language pursuant to PCT Article 21(2).

FIELD OF THE INVENTION

The present invention relates to a method for recovering fibers from white water of a papermaking process, the white water being separated from pulp mixture used for papermaking at different stages of the process, in which method the white water containing fiber material is, together with separate auxiliary pulp, conveyed to a filter such that the auxiliary pulp forms a layer on the surface of the filter and the white water flows through the layer while the fiber material remains in the layer formed by the auxiliary pulp, and in which method a mixture of the fiber material and the auxiliary pulp is removed from the filtering surface and the fiber material separated from the white water is returned to the process.

The present invention further relates to an apparatus for recovering fibers from white water of a papermaking process, the apparatus comprising a filter equipped with a filtering surface, means for feeding the white water to the filter, means for feeding separate auxiliary pulp to the filter in order to form a pulp layer on the filtering surface, means for removing the auxiliary pulp formed on the filtering surface and fiber material separated from the white water from the filtering surface, means for conveying the filtered water from the filter, and a screen for fractionating the auxiliary pulp removed from the filtering surface and the fiber material separated from the white water into two fractions having different roughness.

BACKGROUND OF THE INVENTION

In the manufacturing process of a paper web or a similar fiber web, water is removed from pulp mixture at different stages so as to achieve appropriate pulp and, eventually, a dry web. The water is at least partly recycled to the process, but it is possible that some of it must be removed to a waste water unit. Such filtrate water is separated through different slotted or perforated screens and wires at different stages of the papermaking process, and the filtrate water also takes useful fiber material therewith, the fiber material typically being fine compared to the typical fiber structure of the pulp mixture.

Fiber material is ordinarily recovered from such filtrate water by different filters wherein the filtrate water is conveyed through different filtering surfaces, such as cloth or the like, such that the fiber material remains on the surface of the cloth on the input side of the water and the water is removed from the other side of the cloth. Such devices include, for example, disc filters with large discs formed from filtering elements arranged next to each other. These filtering elements comprise a frame attached on the disc filter on the axle, the element being covered by a filter bag through which the water flows into the axle through an opening located on the inside of the element at the end facing the axle. Drum filters, in which a wire operating as the filtering surface is provided on a cylindrical frame, are also used for the purpose. Such drum and disc filters and the structure and operation thereof are generally known per se to one skilled in the art; therefore, they will not be described in further detail here.

A problem with these solutions is that they should allow a large amount of water to pass through while adsorbing, however, fine fibers on the filtering surface. A solution which has been found efficient in practice is a method wherein a thin layer of pulp having longer fibers, so-called auxiliary pulp, is first built up on the filtering surface to form a thicker filtering layer on the filtering surface on which the fine fiber then remains as the water passes through the layer formed by the auxiliary pulp. The problem with the use of the auxiliary pulp in the known solutions is the feeding of the auxiliary pulp to the device since in the beginning some of the fine fiber material passes through the filtering surface before the auxiliary pulp layer has been formed. Furthermore, the structure and composition of the auxiliary pulp greatly affect its functionality and the operation of the filter. Consequently, the fiber length distribution of the auxiliary pulp greatly affects its operation as the filtering layer.

Finnish Patent FI 88732 discloses a solution wherein the auxiliary pulp to be fed to a filter is fractionated into a short fiber material part and a long fiber material part, of which only the part with the long fibers is fed as the auxiliary pulp into the filtrate water. This solution is quite difficult; furthermore, the fiber structure of the auxiliary pulp has to be such that the auxiliary pulp, as a mixture of the recovered pulp and the fine fibers, can be further fed to be used in the papermaking process.

SUMMARY OF THE INVENTION

An object of the present invention is to provide a method and an apparatus to avoid difficulties of the known solutions, and extremely efficient and functional filtering before fibers are recovered.

A method of the invention is characterized in that the mixture of the auxiliary pulp removed from the filter and the fiber separated from the white water is fractionated into a short-fibered and a long-fibered fractions, the short-fibered pulp fraction being returned to the papermaking process and the long-fibered pulp fraction being returned as the auxiliary pulp to be fed to the filter.

An apparatus of the invention is characterized in that the screen is arranged to fractionate the mixture removed from the filter such that a maximum fiber length of the pulp fraction having the shorter fibers is not greater than the fiber length of the pulp mixture used in the papermaking process, whereby the short-fibered pulp fraction can be returned to the papermaking process, and in that the apparatus comprises means for returning the long-fibered pulp fraction to the filter in order to form a pulp layer on the filtering surface.

The idea underlying the invention is that auxiliary pulp specially manufactured for the purpose is fed to a filter while the length distribution of the auxiliary pulp can be made to perfectly suit the filtering purpose regardless of what kind of pulp is used for the actual papermaking process. A further idea underlying the invention is that the auxiliary pulp is recycled in the filter such that the mixture of the auxiliary pulp and the fine fraction separated from the filter is fractionated into two parts, of which parts the one with the longer fibers is returned to be fed as the auxiliary pulp to the filter and the fraction with the shorter fibers is conveyed back to the papermaking process to be used therein.

An advantage of the invention is that it allows a fiber length to be used which is advantageous to the filtering, in which case the fiber length can greatly differ from the one used in the actual papermaking process. Furthermore, addition of a relatively small amount of the auxiliary pulp suffices since the auxiliary pulp is recycled to the filter after fractionation carried out at the outlet end, and only the part of the fibers that is to be fed into the papermaking process is then forwarded. Furthermore, the use of the auxiliary pulp does not affect the actual main process since the auxiliary pulp can, if necessary, be manufactured completely separately, which means that the main process is allowed to operate continuously without interference. A further advantage is that when the fibers used as the auxiliary pulp have been worked enough, they are transferred to the papermaking process along with the short-fibered pulp fraction separated in the fractionation, without causing any disturbance to the process. A still further advantage of the invention is that the amount of auxiliary pulp that must to be fed to the filter need only be similar to the amount that is removed with the fines during fractionation, whereby on the whole, the necessary amount of the auxiliary pulp is quite small.

BRIEF DESCRIPTION OF THE DRAWINGS

The invention will be described in closer detail in the accompanying drawings, in which.

DETAILED DESCRIPTION OF PREFERRED EMBODIMENTS

Figure 1:
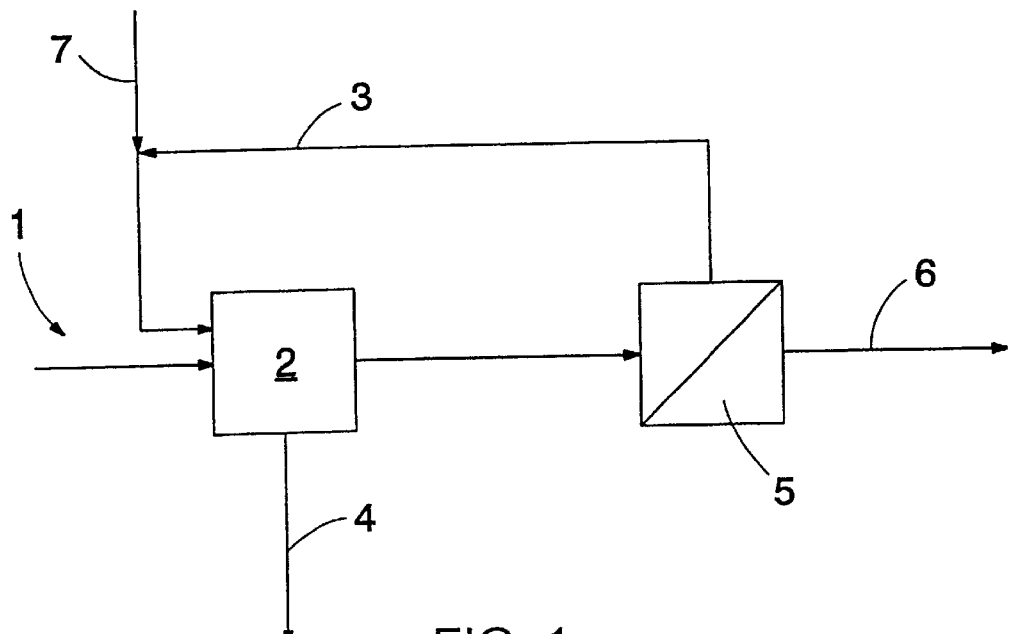
FIG. 1 is a schematic block diagram showing an implementation of a method of the invention.

FIG. 1 is a schematic block diagram showing a method of the invention. In the method, the filtrate water is fed via an inlet channel 1 to a filter 2. Auxiliary pulp is also fed to the filter 2 via a bypass channel 3. The auxiliary pulp forms layers on the filtering surface of the filter 2, collecting fiber brought along with the filtrate water, and is removed therefrom with the short-fibered fraction in a normal manner. The water separated from the filter 2 is removed via an outlet channel 4 to a suitable place either to be returned to the papermaking process or to a waste water treatment plant. The pulp separated from the filtering surface of the filter 2 is conveyed to a fractionation unit 5 to be screened into a short-fibered fraction and a long-fibered fraction. The short-fibered fraction is forwarded via a supply channel 6 back to the papermaking process, and the long-fibered fraction is returned via the bypass channel 3 to the filter 2. In fractionation, the fractionation of the pulp into long and short fibers is dimensioned such that substantially all of the fibers in the short-fibered pulp fraction are of a length less than or equal to a maximum length of fibers of the papermaking pulp used in the papermaking process. Hence, the short-fibered fraction can be fed directly into the ordinary pulp with no effects on the characteristics of the paper or other web being produced. New auxiliary pulp is, if necessary, fed to the filter 2 via an auxiliary-pulp channel 7 continuously at a steady pace or at suitable intervals as the amount of the auxiliary pulp used in the filter is reduced as the fibers thereof are worn shorter, and, eventually taken to the fine fraction in fractionation.

Figure 2:
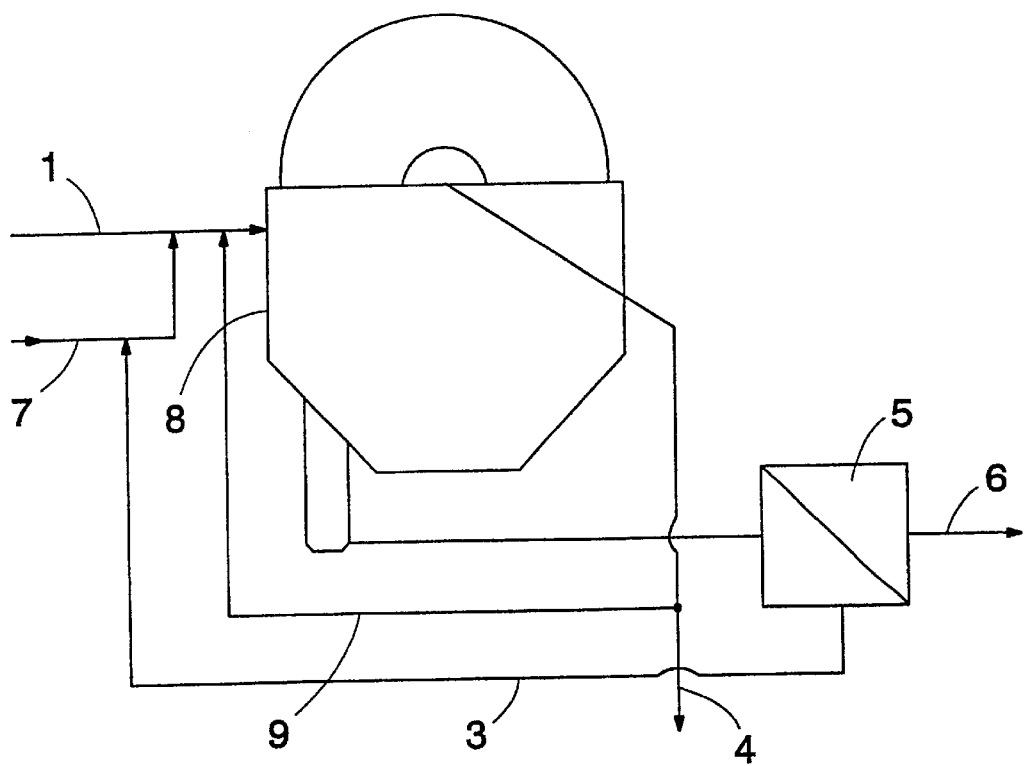
FIG. 2 is a schematic view of an apparatus suitable for implementing the method of the invention.

FIG. 2 schematically shows an apparatus for implementing the method of the invention. The Figure discloses a filter 2, which is a filter known per se, such as a disc filter or a drum filter. The filtrate water with its fibers is fed to a basin 8 around the filter. The auxiliary pulp necessary for the operation can be fed to the basin with clean water before any other functions are initiated, so that the filtrate water and the small fibers therein cannot pass the filter before an auxiliary pulp layer has been formed on the surface of the filter. If necessary, the water separated by the filter can be recycled to the filter via an activation channel 9, in which case by recycling both the auxiliary pulp and the water the filter can be activated before it is necessary to convey the filtrate water separated in the papermaking process to the filter.

When the filtrate water is fed to the filter, it is conveyed to the basin 8 wherein the level of the surface is retained such that the water passed through the filtering surface flows into a channel formed in the axle of the filter and via the channel away from the filter. This "clean" filtrate water can be forwarded either to be returned to the pulp manufacturing process or, if necessary, to be discharged. From the filtering surface, the auxiliary pulp and the fine fiber brought along with the filtrate water are removed in a manner known per se and conveyed as a pulp suspension to fractionation wherein it is screened into the short and long fiber fractions by using a known screen, for example. The long-fibered fraction is returned via the recycling channel 3 to the basin 8 and the short-fibered fraction is forwarded via the supply channel 6.

Figure 3:
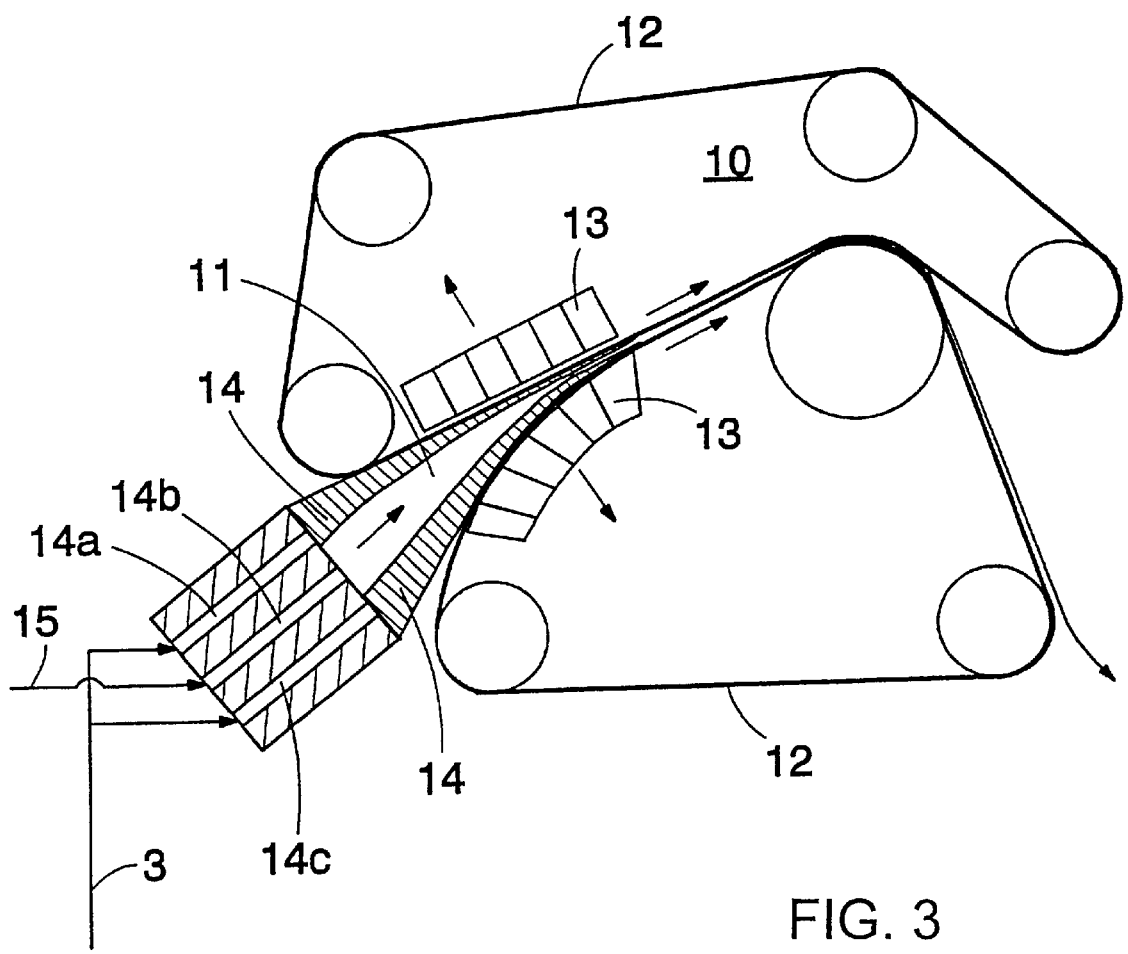
FIG. 3 is a schematic view of another apparatus suitable for implementing the method of the invention.

FIG. 3 schematically shows another apparatus suitable for implementing the method of the invention. In this embodiment, a gap filter 10, which has a structure of a gap converging in the direction of flow, is used as the filter. In the direction of flow of the material to be screened, filtering wires 12 move at both sides of a gap 11, whereby water is removed through the wires 12 and supporting surfaces 13 located outside the wires and equipped with apertures or openings. In order for the auxiliary pulp to form layers on the surface of the wires 12, the input of the gap filter is divided into three input channels 14a, 14b and 14c such that the auxiliary pulp from the bypass channel 3 is fed in via the outmost input channels 14a and 14c facing the wires, and only after an auxiliary pulp layer has been formed, is filtrate water 15 from the middle channel 14b conveyed between auxiliary pulp layers 14, whereby the water is allowed to flow away only through the auxiliary pulp layers 14. This structure enables extremely efficient screening since a desired auxiliary pulp layer is produced on the surfaces of the wires 12 before the filtrate water to be screened is allowed to discharge on the surfaces. Accordingly, a desired thickness of the auxiliary layers 14 and exact desired filtering characteristics can be achieved. Consequently, the screening provided by the gap filter is extremely accurate, the capacity at the same time being extremely high.

Figure 4:
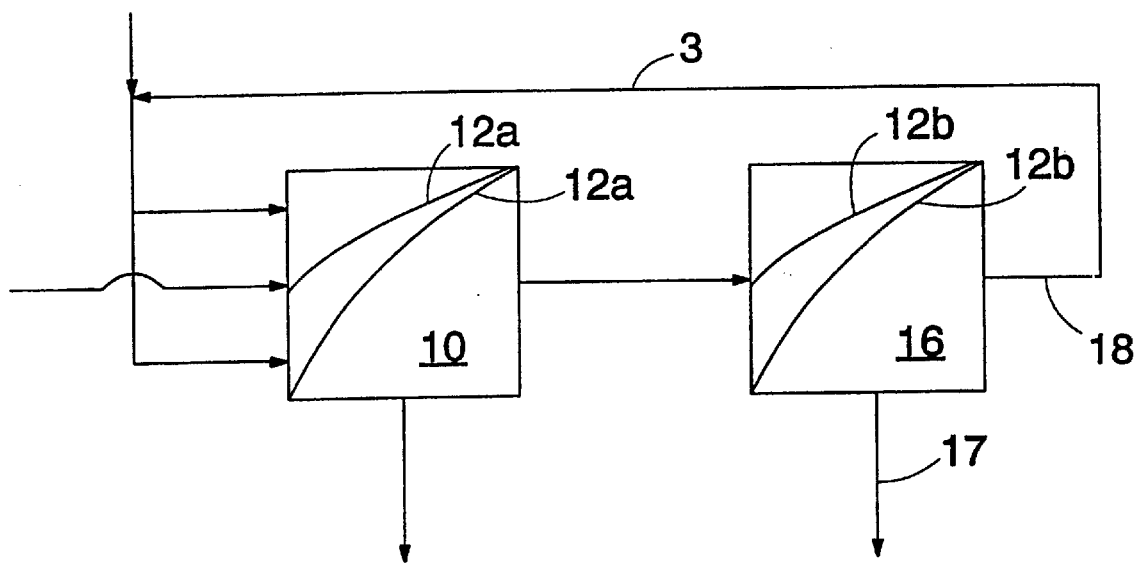
FIG. 4 is a schematic block diagram showing another implementation of the method of the invention.

FIG. 4 is a schematic block diagram showing a method of the invention. In the figure, numbers 10 and 16 schematically show a gap filter and a gap screen, respectively, whose structure and operation are in principle of the type shown in FIG. 3. The only essential difference is that no separate auxiliary pulp is fed to the gap screen on the surface of wires but the pulp to be screened is fed as such between wires 12b of the gap screen 16. In the method, the pulp separated from the gap filter from the surface of wires 12a is conveyed to fractionation where it is fractionated into a long-fibered and a short-fibered fractions, i.e., into an auxiliary pulp fraction 18 and a fraction 17 to be conveyed to the papermaking process. The gap screen 16, for example, to which the pulp suspension to be fractionated is fed, can be used for the fractionation without forming any auxiliary layer on the surface of its wires 12b. This embodiment enables the short fibers to be returned to the papermaking process and some water to be removed through the wires 12b, whereas the long fibers remain on the surface of the wires 12b wherefrom they can be returned to the gap screen 10 via the by-pass channel 3. The combination of the gap filter and the gap screen is extremely efficient both in terms of capacity and screening accuracy and it takes extremely little space compared to large screening drums and disc screens. Furthermore, the operating costs of such devices are quite low since ordinary wires can be used instead of expensive special wires or filter bags. Also in this embodiment utilizing the gap filter, operation can be started by means of the auxiliary pulp only by recycling the water and the auxiliary pulp until the filtrate water to be screened is fed to the gap filter. For fractionation of the detached long and short pulp mixture removed from the gap filter, other ordinary screens, such as cylinder screens or the like, that are commonly known can naturally also be used. In practice, however, the combination comprising the gap filter and the gap screen is clearly more efficient, both technically and economically.

The invention has been described above in the description and the drawings only by way of example and it is by no means restricted thereto. The essential point of the invention is that for separating the fines from filtrate water, separate long-fibered auxiliary pulp is used in a filter, whereafter a mixture of the auxiliary pulp and the fines is fractionated into the long-fibered auxiliary pulp and a fraction having shorter fibers suitable to be fed to the pulp process, the long-fibered auxiliary fraction being returned to a screen in order to form a filtering layer on the surface of the filter.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for recovering fiber material from white water that is separated from papermaking pulp used in a papermaking process, the method comprising:
   feeding the white water containing the fiber material to a filter, and feeding auxiliary pulp to the filter such that the auxiliary pulp forms a layer on a surface of the filter and the white water flows through the layer such that the fiber material remains in the layer formed by the auxiliary pulp so as to form a mixture of auxiliary pulp and fiber material on the surface of the filter;
   removing the mixture of auxiliary pulp and fiber material from the surface of the filter;
   feeding the removed mixture directly from the filter to a fractionation unit which fractionates the mixture of auxiliary pulp and fiber material into a short-fibered pulp fraction and a long-fibered pulp fraction; and
   returning the short-fibered pulp fraction to the papermaking process and returning the long-fibered pulp fraction as auxiliary pulp to the filter.

2. The method of claim 1, wherein the auxiliary pulp is produced from separate pulp having substantially different characteristics from the papermaking pulp used in the papermaking process.

3. The method of claim 1, wherein the mixture removed from the filter is fractionated such that substantially all of the fibers in the short-fibered pulp fraction are of a length less than or equal to a maximum length of fibers of the papermaking pulp.

4. The method of claim 1, wherein substantially all of the fibers in the auxiliary pulp are of a length at least twice that of fibers of the papermaking pulp.

5. The method of claim 1, wherein the auxiliary pulp is fed to the filter to form the layer on the surface of the filter before the white water is fed to the filter.

6. The method of claim 1, wherein a disc or drum filter is used as the filter.

7. The method of claim 1, wherein the steps of feeding the white water and the auxiliary pulp to a filter comprises feeding the white water and auxiliary pulp to a gap filter comprising a pair of opposed wires traveling in a downstream direction and arranged such that a gap is formed between the wires, the gap converging in the downstream direction, and the auxiliary pulp and white water being fed into the gap such that the auxiliary pulp forms a layer on a surface of each wire and the white water is filtered by said layers.

8. The method of claim 7, wherein the step of feeding the auxiliary pulp comprises feeding the auxiliary pulp onto the surfaces of the wires by input channels separate from an input channel through which the white water is fed into the gap, such that the auxiliary pulp forms the layers on the surfaces of the wires before the white water is allowed to come into contact with the auxiliary pulp.

9. The method of claim 7, comprising mixing the auxiliary pulp and white water before feeding the auxiliary pulp and white water into the gap of the gap filter.

10. An apparatus for recovering fiber material from white water that is separated from papermaking pulp used in a papermaking process, the apparatus comprising:
    a filter having a filtering surface;
    means for feeding separate auxiliary pulp to the filter to form a layer of the auxiliary pulp on the filtering surface;
    means for feeding the white water to the filter such that the white water is filtered through the layer of auxiliary pulp on the filtering surface and the fiber material in the white water remains in the layer of auxiliary pulp to form a mixture of auxiliary pulp and fiber material on the filtering surface;
    means for removing the mixture of auxiliary pulp and fiber material from the filtering surface;
    a screen connected to the filter so as to receive the removed mixture of auxiliary pulp and fiber material directly from the filter, the screen operable for fractionating the mixture of auxiliary pulp and fiber material into a short-fibered pulp fraction and a long-fibered pulp fraction, such that substantially all of the fibers in the short-fibered pulp fraction are of a length less than or equal to a maximum length of fibers of the papermaking pulp, whereby the short-fibered pulp fraction can be returned to the papermaking process; and
    means for returning the long-fibered pulp fraction to the filter as auxiliary pulp to form a layer on the filter surface.

11. The apparatus of claim 10, wherein the auxiliary pulp used in the filter has substantially different characteristics from the papermaking pulp used in the papermaking process.

12. The apparatus of claim 10, wherein the filter comprises a disc or drum filter.

13. The apparatus of claim 10, wherein the auxiliary pulp and white water have been mixed before being fed to the filter.

14. The apparatus of claim 10, wherein the screen comprises a gap screen.

15. An apparatus for recovering fiber material from white water that is separated from papermaking pulp used in a papermaking process, the apparatus comprising:

a gap filter comprising a pair of opposed wires traveling in a downstream direction and arranged such that a gap is formed between the wires, the gap converging in the downstream direction;

means for feeding separate auxiliary pulp to the filter to form a layer of the auxiliary pulp on each of the wires;

means for feeding the white water to the filter such that the white water is filtered through the layer of auxiliary pulp on the wires and the fiber material in the white water remains in the layer of auxiliary pulp to form a mixture of auxiliary pulp and fiber material;

means for removing the mixture of auxiliary pulp and fiber material from the wires;

a screen for fractionating the mixture of auxiliary pulp and fiber material into a short-fibered pulp fraction and a long-fibered pulp fraction, such that substantially all of the fibers in the short-fibered pulp fraction are of a length less than or equal to a maximum length of fibers of the papermaking pulp, whereby the short-fibered pulp fraction can be returned to the papermaking process; and means for returning the long-fibered pulp fraction to the filter as auxiliary pulp to form a layer on the wires.

16. The apparatus of claim 15, wherein the gap filter includes a pair of outermost input channels that feed the auxiliary pulp onto the surfaces of the wires and a middle input channel disposed between the outermost input channels, the middle input channel feeding the white water into the gap filter, whereby the auxiliary pulp forms layers on the surfaces of the wires before the white water is allowed to come into contact with the auxiliary pulp.

* * * * *